July 22, 1969  H. D. URDANOFF  3,456,798
METHOD AND APPARATUS FOR CLARIFYING LIQUIDS
Filed July 16, 1968  6 Sheets-Sheet 4
FIG. VIII
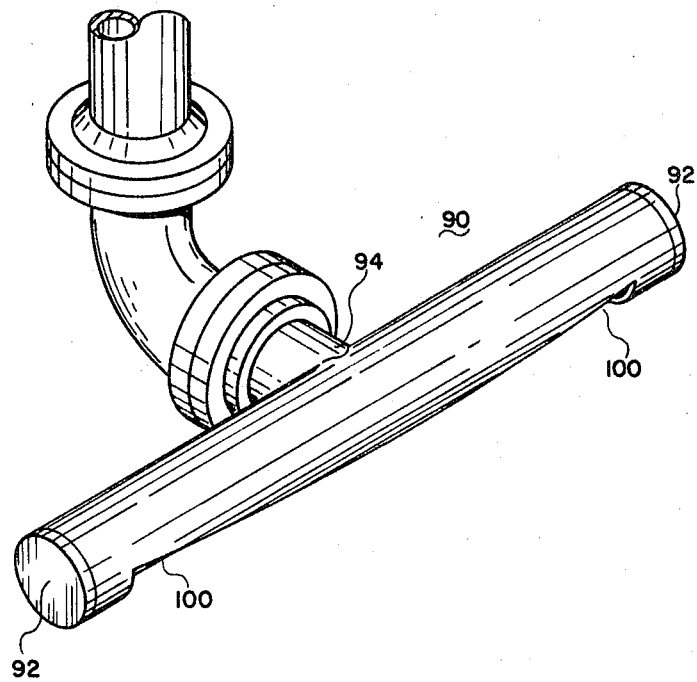
FIG. VII
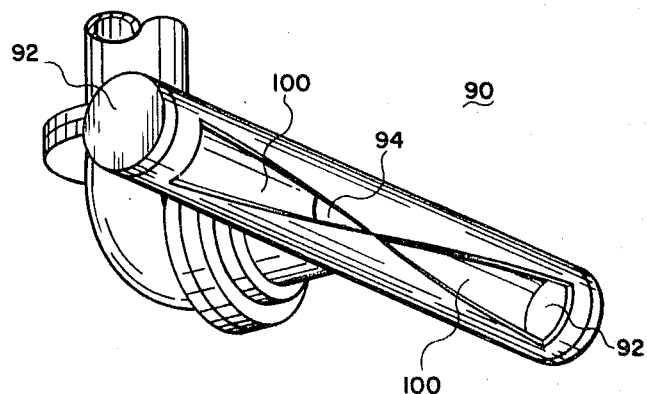
INVENTOR.
HOWARD D. URDANOFF
BY
ATTORNEY

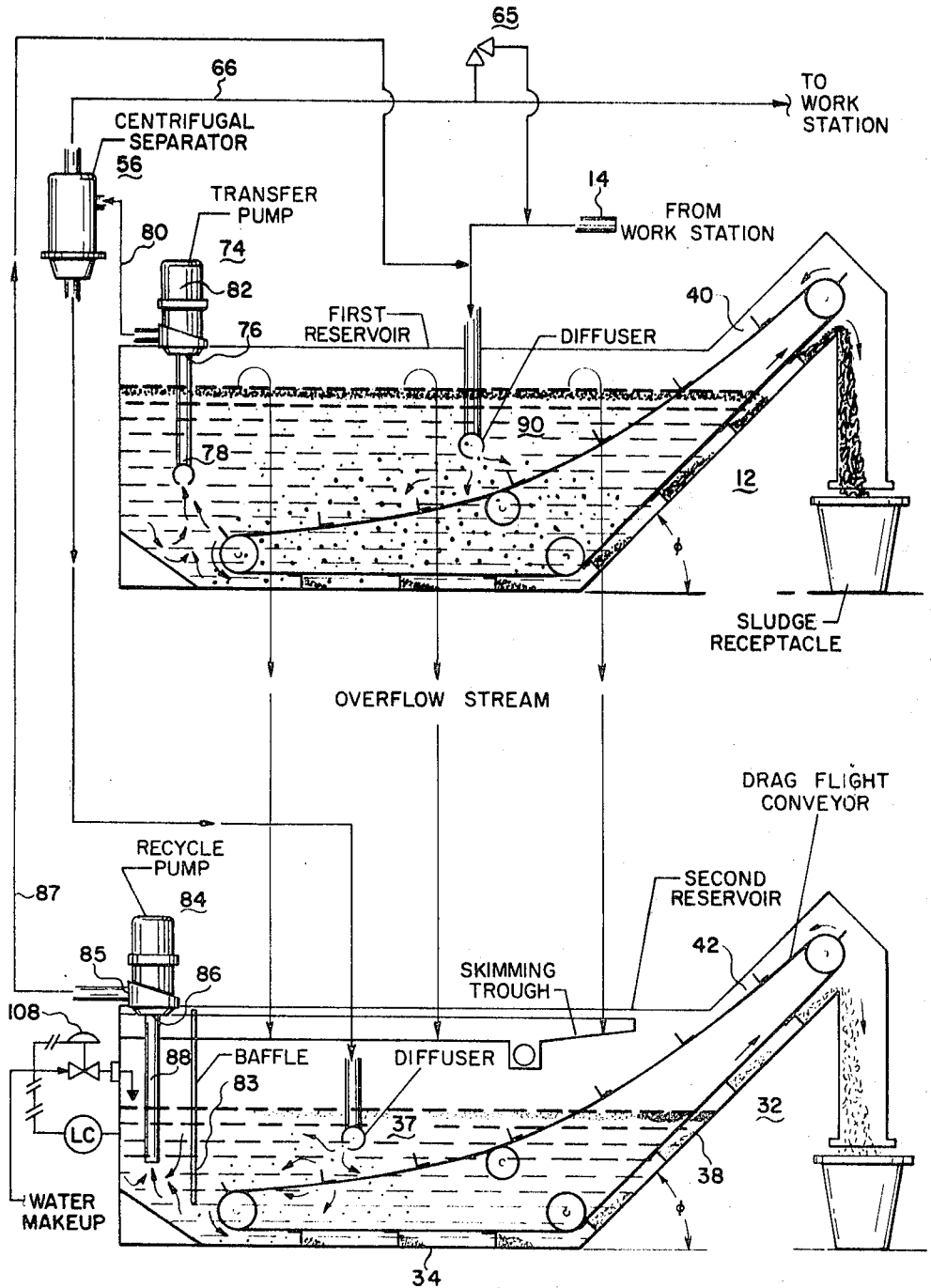
FIG. I

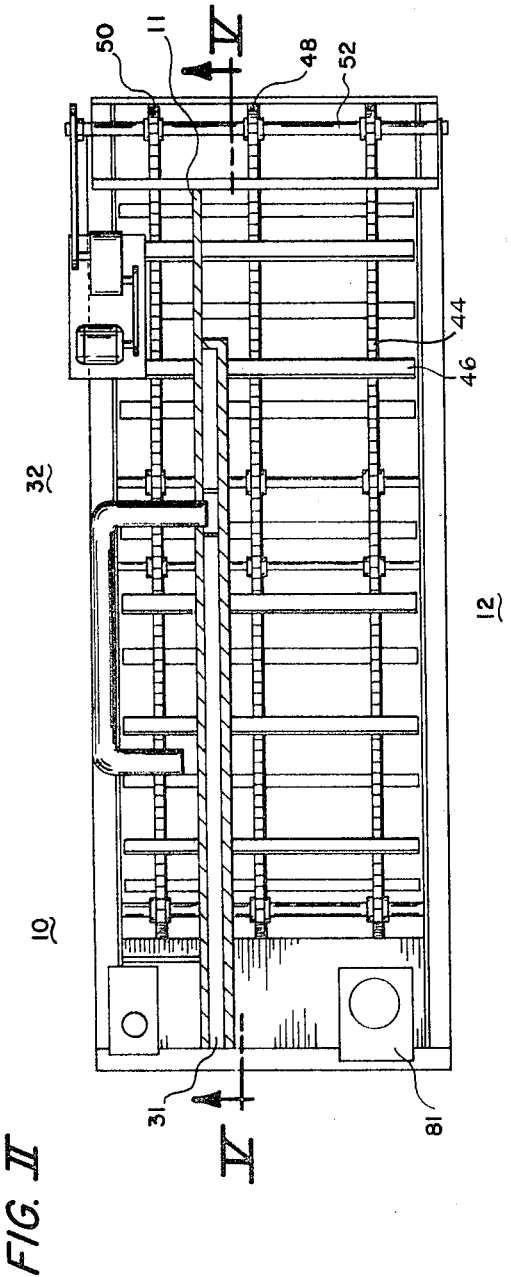
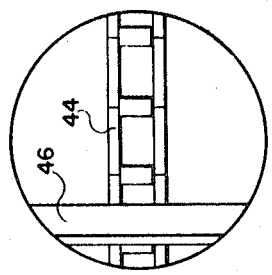
FIG. II
FIG. III
INVENTOR.
HOWARD D. URDANOFF

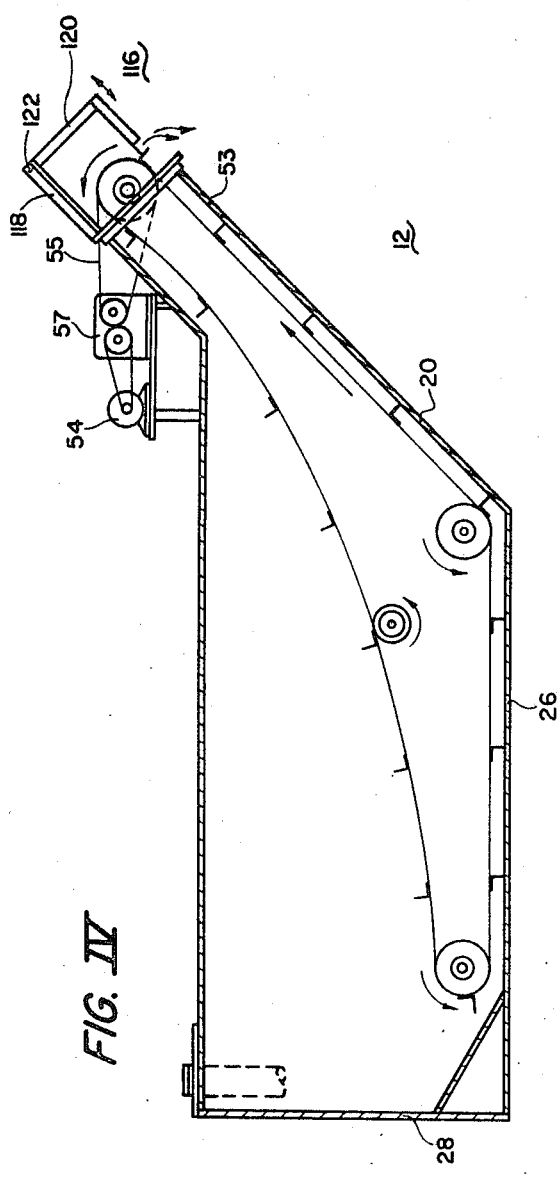
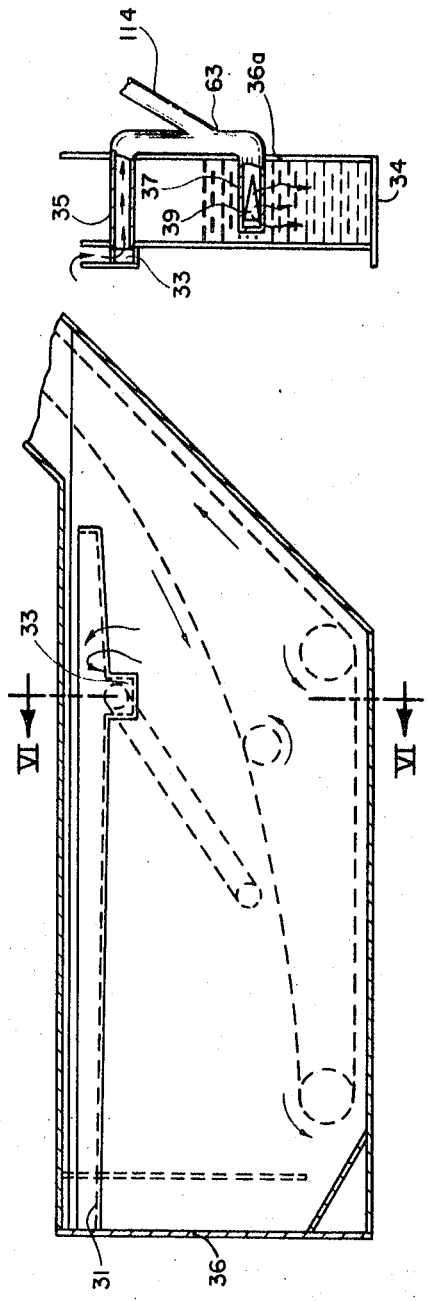

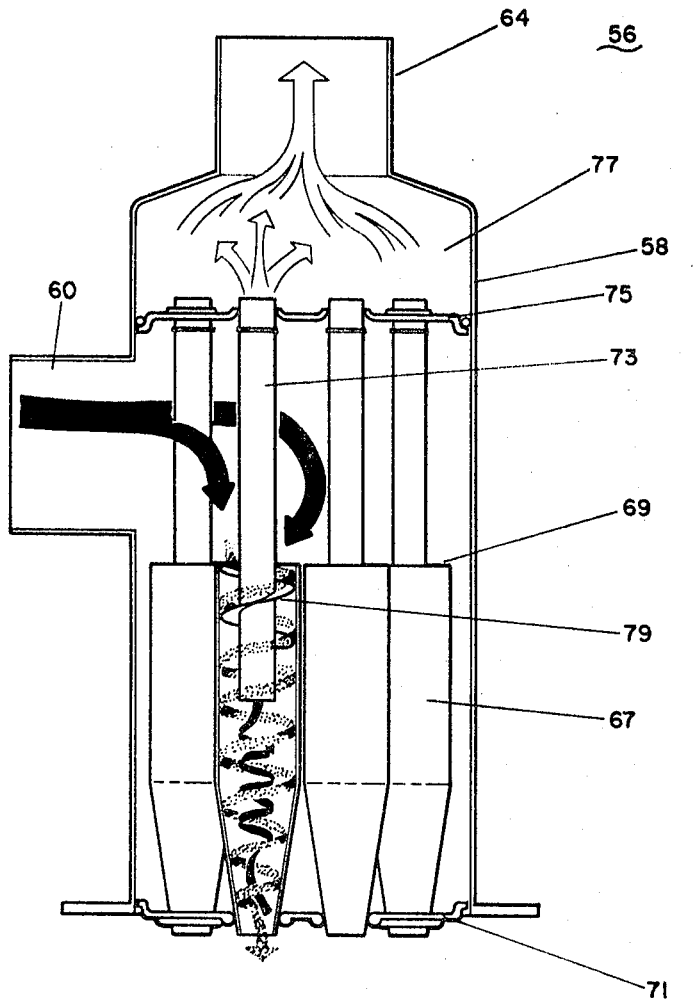
FIG. IX
INVENTOR.
HOWARD D. URDANOFF

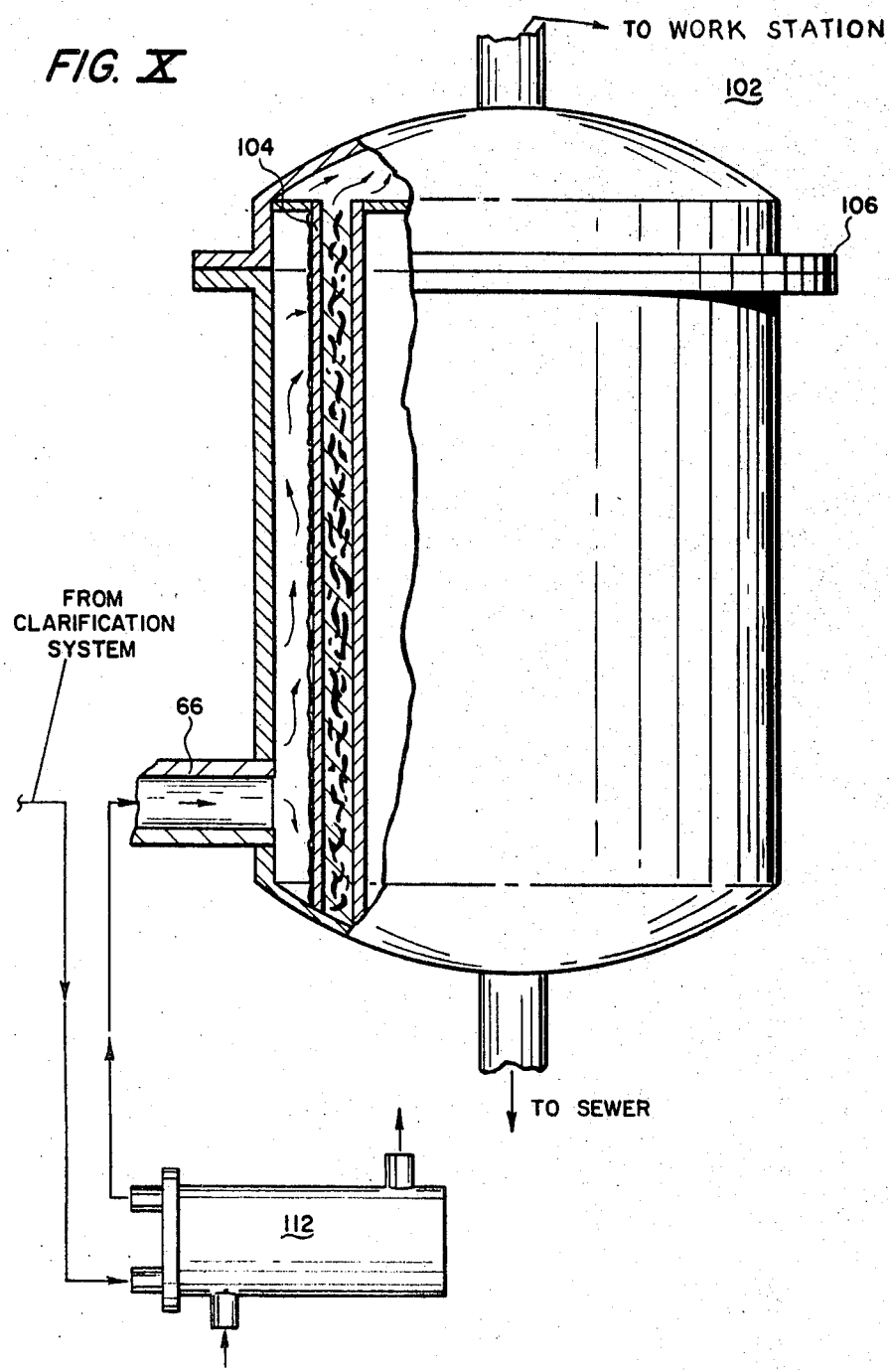

United States Patent Office 3,456,798
Patented July 22, 1969

3,456,798
METHOD AND APPARATUS FOR
CLARIFYING LIQUIDS
Howard D. Urdanoff, 74 Coachman Lane,
Levittown, N.Y. 11756
Filed July 16, 1968, Ser. No. 745,208
Int. Cl. C02c 1/30; B01d 21/26, 21/04
U.S. Cl. 210—73                                    22 Claims

ABSTRACT OF THE DISCLOSURE

Contaminants such as solids of various sizes, and insoluble oils are removed from liquids used in machining operations by means of a multi-stage system wherein heavy solids initially are settled out of the liquid in an elongated reservoir before being removed by slowly rotating conveyor means therein; a portion of the liquid bearing lighter solids is pumped from above the settled solids in the reservoir through a centrifugal separator where the additional forces generated therein remove the lighter solid contaminants from this portion with the overflow being returned to the work station as clarified liquid; the underflow from the separator containing entrained liquid and solids flows by gravity into a second reservoir designed to provide a residence time exceeding that of the first reservoir for settling out the lighter solids whereupon they are removed in a manner similar to that occurring in the first reservoir; a portion of the liquid above the settled solids in the second reservoir is continuously recycled into the first reservoir to cause an overflow of liquid bearing the floating portion of the contaminants out of the first reservoir whereupon it is collected and introduced beneath the liquid surface in the second reservoir in a manner so as to cause a flow pattern of the liquid and floating contaminants towards the solids exit end of the second reservoir; the floating contaminants are skimmed off of the liquid surface near this solids exit end by the same means used to remove settled solids therein.

---

This application relates to a method and apparatus for clarifying liquids and particularly for clarifying liquids used in machining work such as coolants, which contain dispersed solid and insoluble liquid impurities which are picked up during the machining operation.

Coolants are necessary in operating machine tool equipment such as grinders, drill presses, lathes, rolling mills, etc. in order to extract the frictional heat generated in the performance of the work, to lubricate the tool and surface of the work piece to minimize the generation of this frictional heat and to provide the desired smooth surface finish on the work piece. In the specific case of rolling mills, wherein metal is reduced in size and shaped, coolants are normally employed to extract the heat generated at the roll bite. Unless heat is extracted, thermal expansion of the rolls, which is greater in the center than at the edges, causes dimensional instability and results in a non-uniform shape of the metal being processed. During th machining operation or rolling operation the coolant becomes contaminated with a number of different types of materials of various sizes and shapes such as the metal chips and shavings removed from the work piece, flaking metal oxides, swarf, abrasive micron sized particles worn from the surfaces of grinding wheels if a grinding operation is being carried out, bonding agents used to hold the particles of the grinding wheel together and insoluble liquids such as hydrocarbon tramp oils which are forced off of the work piece by the impinging coolant and which are present often because of leaks in various hydraulic drive and lubrication systems. The uncontaminated coolant stream generally contains minor amounts of valuable soluble oils to enhance the lubricity of the coolant and prevent rusting, which generally renders disposal of the coolant stream too costly after only a single pass. This is especially applicable in view of recently developed high speed cutting techniques where the amount of coolant required is substantially increased because of the increase in the generation of frictional heat. Needless to say, the above-mentioned impurities must be removed from the coolant before it is reused, since the solid contaminants can scratch and damage the surface of a valuable work piece, whereas the mixed oils and solids diminish the cutting efficiency of the machine tool if sprayed back onto its surface, and further tend to coat transfer piping and plug flow nozzles. Clarification is especially important in the aforementioned high speed cutting operations since high tolerance requirements usually accompany such techniques. Furthermore, when exposed to each other, the coarse and fine solid contaminants tend to become coated with the insoluble liquid impurities entrapping air therein in so doing, so as to form a gummy type of gelatinous intermediate substance usually comprising fine solid particles and entrapped air coated with insoluble liquids such as oils. This intermediate material for the most part is lighter than the coolant and tends to float to or just below the surface of the liquid in the spent coolant sump.

Conventional techniques as have been used in the past which are dependent solely on settling impurities to the bottom of a coolant tank whereupon they are removed, cannot be relied upon to satisfactorily separate these types of impurities from the coolant, because of surface and interfacial tension effects, with the result that the coolant which has only been partially clarified is returned to the machining station, thus generating all the problems which an effective treatment system is supposed to overcome. Blades vertically moving through liquid in a quiescent tank have been used, but these contact only a minor portion of the tank contents, quickly become gummy and coated with the impurities, whereupon their efficiency is greatly reduced to the point that some of the impurities are dumped back into the reservoir. Filters have been used but for heavy duty service they obviously require considerable shut down time and substantial manpower requirements to replace expensive filter media, with a resulting reduction in economics of the overall machining system.

Now there has been developed a novel, multi-stage treatment system for clarifying liquids which overcomes the prior art difficulties discussed above and which is especially adaptable to machining operations wherein the impurities generated are a mixture of solids, insoluble liquids and intermediate products resulting from their combination. "Machining" equipment as used herein is meant to include drill presses, lathes, grinding wheels, rolling mills, screw and milling machines, etc. "Impurities" is herein meant to include heavy and light solids such as swarf of varying particle sizes which may or may not float on the surface of the liquid, insoluble liquids, such as oils having a specific gravity less than that of the liquid in which they are dispersed, as well as the gelatinous intermediate products generally resulting from a coalescence of the insoluble liquids with the solids in the presence of air, which also float at or near the surface of the liquid in which they are present.

Accordingly, it is a principal object of this invention to provide an improved method and apparatus for clarifying liquids, particularly those used in machining work.

It is an additional object of this invention to provide a method and apparatus for clarifying machine coolants which are highly efficient in operation without requiring high conventional filter media replacement costs and expensive maintenance down time.

It is an additional object of this invention to provide a method and apparatus for clarifying machine coolants which is capable of separating from the coolant, impurities which float as well as those which settle, either individually or in combination equally as well.

It is another object of this invention to provide a novel method and apparatus for continuously removing floating impurities from machine coolants.

It is a further object of this invention to provide a method and apparatus for clarifying machine coolants in which the impurities are removed from the coolant either intermittently or continuously with a minimum of coolant loss occurring out with the rejected materials, thereby permitting ready disposal of the impurities removed without difficulty.

It is a still further object of this invention to provide a method and apparatus for clarifying liquids such as machine coolants which functions as a central treating system capable of flexibly handling the coolant issuing from single or multiple machining operations of either the same or different types, utilizing a minimum of floor space and requiring only a nominal initial cost.

It is a further object of this invention to provide a method and apparatus for overcoming the prior art difficulties discussed above.

These and other objects will in part be obvious and will in part appear hereinafter.

These and other objects are accomplished by providing a method for clarifying liquids having impurities dispersed therein which comprises delivering the liquid to be clarified to a first reservoir from a machining station; continuously forcing the liquid carrying the impurities through a first diffuser into the reservoir at a substantially constant reservoir entrance velocity to evenly disperse the liquid having the impurities therein across the reservoir; retaining the liquid and thereby the impurities in the reservoir for a predetermined time period to permit the bulk of the heavy solids portion of the impurities to settle to a bottom zone therein and to permit the light floatable impurities to rise to the surface of the liquid therein; gently conveying the settled impurities and trace amounts of entrained liquid from the lower zone of the reservoir out an exit end thereof to withdraw the settled impurities and trace amounts of entrained liquid from the reservoir without disturbing the gravitational settling occurring therein; passing a first portion of the liquid and dispersed impurities which are located below the surface of the liquid and above the zone of the settled solids in the first reservoir through a centrifugal separator to generate additional downwardly oriented forces on the first portion, thereby separating from the first portion additional solid impurities which are somewhat lighter than those settled in the first reservoir, along with entrained liquid to form an underflow stream issuing from the separator, the remainder of the first portion forming an overflow stream also issuing from the separator and for return to the machining station; continuously introducing the underflow portion containing the somewhat lighter solid impurities and entrained liquid through a second diffuser into a second reservoir at a substantially constant reservoir entrance velocity to evenly disperse the entrained liquid and somewhat lighter solid impurities across the second reservoir; retaining the liquid and thereby the somewhat lighter solid impurities in the second reservoir for a predetermined time period which is in excess of that for the first reservoir, to permit the somewhat lighter solid impurities to settle to a bottom zone therein; gently conveying the somewhat lighter solid impurities and trace amounts of entrained liquid from the lower zone of the second reservoir out an exit of the second reservoir; continuously recycling a portion of the liquid above the bottom zone of the second reservoir back through the first diffuser into the first reservoir below the surface of the liquid therein to cause a second portion of the liquid and dispersed impurities which are substantially floating impurities to flow out of the first reservoir along a substantial portion of one side of the first reservoir; collecting the overflowing second portion containing liquid and substantially floating impurities below the top of said side of the first reservoir and above the surface of the liquid in the second reservoir; introducing the collected overflowed liquid and substantially floating impurities into the second reservoir through the second diffuser below the surface of the liquid therein in such a manner as to establish a flow pattern of said oil impurities to the surface of the liquid therein and then towards the solids exit end of the second reservoir; and gently skimming the floating impurities off the surface of the liquid in the second reservoir adjacent the solids exit end thereof.

An apparatus for carrying out the above method is likewise provided.

In describing the overall invention, reference will be made to preferred embodiments illustrated in the accompanying drawings in which:

FIG. I is a schematic flow diagram of the system of the present invention;

FIG. II is a plan view of equipment embodying the present invention;

FIG. III is an exploded view of a portion of the equipment of FIG. II;

FIG. IV is a partial front, elevational view of the equipment of FIG. II;

FIG. V is a sectional view taken along the line V—V of FIG. II;

FIG. VI is a schematic view taken along the line VI—VI of FIG. V;

FIGS. VII–VIII are perspective views of a portion of the apparatus of the present invention;

FIG. IX is a schematic, sectional view with parts broken away of another portion of the apparatus of the present invention; and FIG. X is a schematic sectional view of an alternate form of apparatus embodied by the present invention.

With reference to the drawings wherein identical numbers refer to identical parts, there is schematically shown in FIG. I a system for clarifying liquids, such as machine tool coolants, having impurities dispersed therein which are of the floatable and/or settleable variety. This system comprises a generally rectangular, elongated tank 10 separated along its axis by plate 11 into compartments defining a first reservoir 12 and a second reservoir 32. Plate 11 is positioned with respect to the axis of the tank 10 such that the volumetric capacity of the first reservoir 12 exceeds that of the second reservoir 32. Plate 11 accordingly comprises a common side of both reservoirs 12 and 32. Liquid to be clarified is fed from one or more machining stations through a system inlet conduit typically depicted as 14 in FIG. I. It will be understood that supply to the clarification system through conduit 14 may be either by means of a supply pump having inlet and outlet connections connected into supply conduit 14 between the machining station and the clarification system, or by gravity when adequate elevation is available. The latter is preferred to avoid shutdown for pump maintenance, i.e. unplugging.

First reservoir 12 (FIG. IV) of the clarification system is of generally rectangular shape and comprises base 26 and a plurality of sides 28 suitably secured (e.g. by welding) to base 26 and extending upwardly therefrom to define an open top. The sides 28 preferably comprise oppositely disposed sidewalls and endwalls. One of the sides 20 of first reservoir 12 is secured at an acute angle to base 26 for a purpose to be hereinafter further described. This angle $\phi$ of side 20 with base 26 of generally rectangular reservoir 12 is preferably maintained at between about 30 to 50 degrees.

Second reservoir 32 (FIG. V) which is likewise of generally rectangular shape is provided as a compartment of tank 10 adjacent first reservoir 12. Reservoir 32 is constructed similarly to that of reservoir 12 i.e., having a base 34, a plurality of spaced sides 36 secured (e.g., by welding) to the periphery of base 34 and extending upwardly therefrom to define an open top. The combined open tops of reservoirs 12 and 32 may optionally be closed over by a suitable shroud when it is desired to protect the contents thereof from the surroundings. One of the sides 38 of second reservoir 32 is fastened at an acute angle to base 34, again for a purpose hereinafter more fully described. The angle of side 38 with base 34 of generally rectangular reservoir 32 is preferably maintained as that for reservoir 12, i.e., between about 30 to 50 degrees.

A shallow skimming trough 31 is secured to plate 11 (FIGS. II and V) within reservoir 12 below the top thereof. Trough 31 has a sloping bottom which is inclined toward collection outlet 33, which in turn is connected to conduit 35 through an opening in plate 11. Conduit 35 extends across reservoir 32 in a lateral direction and then angles downwardly whereupon it is connected to a laterally disposed second diffuser 37 positioned in an opening in side 36a above the base 34. Diffuser 37 is vertical positioned such that it is located below the surface of the liquid in reservoir 32 and has a triangular slot 39 cut therein designed to deliver liquids and dispersed impurities into reservoir 32 at a substantially uniform entrance velocity. As indicated in FIG. V, trough 31 extends along a substantial portion of the full length of plate 11 and in any event should extend for at least about 75 and preferably 90 percent of the total length of this side for a purpose to be hereinafter described.

Obviously reservoirs 12 and 32 may be individual tanks separated from each other, or as suggested in the drawings, and preferred for space and fabrication economies, may be provided as individual compartments separated by a common side as portions of a single large tank. Reservoirs 12 and 32, as well as the operating surfaces of the remaining equipment to be hereinafter described may be constructed of any material, such as metal or plastic, and surface coated when necessary with a resistant material depending on the nature of the materials being processed.

Conveying means (FIGS. II–IV) are provided in first and second reservoirs 12 and 32 for withdrawing settled solids therefrom in a substantially dry condition. These means are preferably in the form of endless rotating drag flight conveyors 40 and 42, each of which comprises endless chain 44 (FIG. III) on which are secured, by bolts or other suitable means, a series of spaced rakes 46 in the form of angle irons, which extend laterally across reservoirs 12 and 32 terminating short of the elongated sides of each. Conveyors 40 and 42 are adapted as depicted in FIG. I to move across the bottoms of the first and second reservoirs, up one side thereof across the top and down the other side thereof. Conveyors 40 and 42 are mounted for rotatable movement by means of drive means which comprises sprockets 48 and 50 which intermesh at their peripheries with chain links 44. Sprockets 48 and 50 in turn are secured on a common drive shaft 52 which in turn is journaled in suitable bearings within housings secured to reservoirs extension 53. One end of shaft 52 (FIG. IV) is connected by means of pulleys and a belt 55 to speed reducer 57 which in turn is rotatably connected to electric drive motor 54. The single drive means just described functions to simultaneously rotate both conveyors preferably at a relatively slow speed of from about 2 inches to 3 feet per minute. Obviously, individual drive systems could be utilized for each conveyor, as well as alternate means for transmitting power to the drag conveyors. Means 116 (FIG. IV) are provided for cleaning each conveyor rake after discharge of sludge and prior to re-entry into either reservoir 12 or 32. These means comprise a support 118 and an angled cleaning blade 120 pivotally mounted on support 118 by means of pin 122.

A centrifugal separator 56 (FIG. IX) is provided above reservoir 32. Separator 56 comprises an outer chamber portion 58 having an inlet 60, centrally located with respect to the axis of chamber 58, in its upper end. Underflow discharge opening 62 is in the center of the conical bottom 61 of separator 56. Opening 62 is connected by means of a suitable conduit 114 to conduit 35 above the liquid overflow inlet at 63 (FIG. VI) to second reservoir 32. Overflow discharge opening 64 is provided in the upper end of chamber 58 which in turn is connected with conduit 66 schematically shown in FIG. I for returning clarified coolant to the work station(s). Separator 56 further has within chamber portion 58, one or more small diameter cyclone tubes 67 open at one end 69 to the interior of chamber 58 and at the other end to conical bottom 61. These tubes 67 are secured by fastening within openings in the bottom tube sheet 71. Each tube 67 has a center tube 73 of smaller diameter and projecting into it through openings 69. Tubes 73 are open at each end and held in place in openings in upper tube sheet 75. The upper end of each tube 73 opens into the upper section 77 of chamber 58 which leads to overflow discharge opening 64. Helical flights 79 are secured in the space between the lower portion of tubes 73 and the upper portion of cyclone tubes 67.

A transfer pump 74 is provided having an inlet 76 connected to conduit 78 which extends into reservoir 12 terminating at its lower end above the base 26 of reservoir 12, and above the adjacent sprocket of the conveying means. Conduit 78 preferably has a liquid velocity equalizing diffuser on its lower end of a type to be hereinafter more fully described. Pump 74 is located in the end of reservoir 12 which is opposite inclined side 20 of reservoir 12 along which the impurities are discharged during operation of the conveyor system. For space and piping economies, pump 74 is mounted directly on reservoir 12 by means of mounting plate 81, but obviously it could be separatedly supported and connected to reservoir 12 through a separate conduit. Pump 74 has its discharge connected through conduit 80 to the inlet 60 of centrifugal separator 56. Pump 74 is driven by electric motor 82.

Relief valve 65 (FIG. I) is provided in conduit 66 for recycling clarified liquid back to the purification system, should this be necessary because of a closing off of the system outlet line to the work stations while the transfer pump remains in operation. It should be noted that additional work stations may be tied into the clarification system by means of suitable conduits connected into the system feed and discharge lines.

A recycle pump 84 is provided having an inlet 86 connected to conduit 88 which extends into reservoir 32 terminating at its lower end above the base 34 of reservoir 32. Baffle 83 fastened to one side of reservoir 32 is provided in front of conduit 88 and terminates below the lower end of conduit 88 as depicted in FIG. I. Pump 84 is also located in the end of reservoir 32 which is opposite that of inclined side 38 thereof. Pump 84 has its discharge outlet 85 connected through conduit 87 to the inlet conduit 14 feeding the system through first diffuser 90 to be hereinafter described.

First diffused 90 (FIGS. I, VII and VIII) is fixedly mounted within reservoir 12 below the surface of the operating liquid level therein by means of suitable supports (not shown) and functions to introduce the contaminated liquid entering the first reservoir from the machining stations at a substantially constant entrance velocity. Diffuser 90 is a generally cylindrical elongated tube and is laterally disposed generally perpendicular to the axis of reservoir 12. Diffuser 90 has spaced end walls 92 and an inlet opening 94 located on one side in the center thereof, which is connected to a contaminated liquid feed conduit 14, which conveys contaminated liquid from the work stations and the underflow from separator 56 to diffuser 90. Diffuser 90 has, at an angle of about 225 degrees from inlet 94 (FIG. VII), a pair of slots 100 which gradually increase in open area in a direction away from the center toward either end wall 92. In the form shown, slots 100 are in the shape of triangles having abutting apexes which are aligned below the center of inlet opening 94. It should be understood, however, that any slot shape increasing in open area toward the end of the diffuser should likewise give adequate results. Under certain conditions, the diffuser may take alternate forms, i.e., be a perforated tube, a series of flow nozzles or a supported porous fabric etc.

In FIG. X is shown an alternate embodiment of the invention involving the use of a filter 102 having replaceable cartridges 104 reached by means of cooperating flanges 106. Filter 102 may be positioned in conduit 66 returning clarified liquid from the clarification system to the work stations to remove trace amounts of micronic impurities in those applications requiring an unusually high degree of contaminant removal, such as in mill roll machine tool operations. Because of the efficiency of the upstream clarification system of the present invention, its size and therefore its maintenance and initial costs are quite low.

A level controller LC (FIG. I) and diaphragm valve 108 are connected to reservoir 32 to supply makeup liquid, such as water, to the system as required to compensate for losses out with the settled impurities or due to evaporation.

In operation, coolant is discharged from one or more work stations through system supply conduit 14. As mentioned, flow is by gravity, however a supply pump may be installed in conduit 14 when adequate elevational pressure head is unavailable, to continuously force the liquid to be clarified through first diffuser 90 in reservoir 12. The coolant delivered through conduit 14 to reservoir 12 is heavily laden with dispersed solids of varying particle sizes, which may either settle or float on standing and/or insoluble oil impurities of the type discussed previously, and enters a first diffuser 90 through its inlet 94. Diffuser 90 is situated at a point along the axis of reservoir 12 which is on the conveyor means drive side of the horizontal center line of the reservoir (FIG. I). On passing through diffuser 90 and slots 100 therein the entering material initially strikes against the wall at the apexes of the triangular slots. In passing to either side and out through slots 100 the velocity of the liquid and the solids carried therein is reduced because of the increase in open area of the slots towards the end of the diffuser so as to avoid a buildup of solids in a particular area of the reservoir and to evenly disperse the liquids and impurities across the tank in a gentle manner at a decreasing velocity towards the sides of the reservoir. As apparent from FIG. I, flow through the diffuser is oriented in a direction opposite to the direction of rotation of conveyor 40. The liquid and impurities enter the reservoir at a substantially constant entrance velocity of between about 0.1 to 4 and perferably 0.5 to 1 feet per second into the reservoir. Preferably, supply conduit 14 immediately upstream of diffuser 90 is expanded in size and angled a few times by means of elbows in the line, in order to decrease the velocity of the materials being delivered to the reservoir 12 before they ever reach first diffuser 90.

It is important to maintain the entrance velocity of the materials to the first reservoir low and substantially constant since otherwise floating matter will tend to be carried through to the inlet to transfer pump 82. Velocities much in excess of 4 feet per second also tend to wash the solids off of the conveyor flights, disturb settling equilibrium in the tank and establish undesirable eddy currents therein.

The volumetric capacity of reservoir 12 is matched with the design supply rate of contaminated liquid so as to provide adequate residence time in reservoir 12 to permit the bulk of the heavier of the solid impurities to settle to a bottom zone therein, while at the same time providing adequate time for the floatable insoluble oil and intermediate products to rise to the surface of the liquid as schematically illustrated in FIG. I. This latter point is an important aspect of the present invention since removal of floating debris is an important feature herein. Continued introduction after initial filling should be below the surface of the liquid therein to avoid disturbance of the longitudinal movements of the settling and rising impurities.

When the heavier of the solid impurities have settled to the bottom zone of reservoir 12, they are gently forced or conveyed by means of conveyor 42 and rakes 46 across the bottom 26 of reservoir 12, up along inclined side 20 and over the top thereof into a suitable sludge basket where the discharged impurities are collected. As the rakes revolve upwardly around the peripheries of sprockets 48 and 50, and after the bulk of the sludge has been discharged by gravity therefrom, the remaining traces of sludge are scraped or wiped from the surfaces of the rakes (FIG. IV) by means of pivoting blades 120, which also falls by gravity into the sludge receptacle. It has been found that by maintaining the angle $\phi$ of each of the inclined sides of reservoirs 12 and 32 at between about 30 to 50 degrees, and preferably about 45 degrees, while utilizing 90 degree angle irons as the rakes to convey the solids in both the first and second reservoirs, that the optimum amount of solids can be removed without having anything substantial fall back into the reservoir. Because of the gentle action of the rakes and the slow peripheral speed of the conveyor (between about 2 inches to 3 feet per minute) the settled solids are moved out in a substantially dry condition. However, trace amounts of entrained coolant will be carried out with the solids. To minimize this, the conveyors 40 and 42 may be intermittently interrupted according to a predetermined time schedule by means of an adjustable time delay relay connected into the electrical circuitry of conveyor drive motor 54. This permits trace amounts of liquid entrained with the solids to drain back into the reservoir out of those solids carried on the rakes which are above the liquid level in the reservoir leading toward but short of the exit end thereof when the conveyors stop.

While contaminated liquid is being continuously fed to first reservoir 12 and while solids settling and removal is occurring therein, a portion of the liquid and dispersed impurities which are located below the surface of the liquid in reservoir 12 and above the zone of the settled solids therein is drawn off by means of transfer pump 82 through conduit 78 and passed through conduit 80 into centrifugal separator 56 through inlet nozzle 60 therein. Conduit 78 preferably has a diffuser of the type illustrated in FIGS. VII and VIII on its lower end to reduce the entrance velocity thereto and minimize the pulling of settled solids off the base of reservoir 12 into pump 82. On entering the interior of chamber 58 through centrally located nozzle 60 by means of the pressure generated by pump 74, the contaminated liquid from which the bulk of the heavier solids have been removed, passes downwardly into the open upper ends of cyclone tubes 67 and into contact with helical flights or vanes 79. These vanes produce a high velocity vortex within each tube 67, resulting in the somewhat lighter solid impurities being thrown to the outside of the interior of tubes 67. It has further been found that the substantial centrifugal forces developed on these particles in the separator tend to agglomerate them and facilitate downstream settling in the second reservoir. These particles, along with some entrained liquid are carried downwardly to the bottom of tubes 67 as depicted schematically in FIG. IX into bottom 61 and ejected out through nozzle 62. The clarified liquid, located at the center of tubes 67 reverses flow at the bottom of tubes 67 and returns through center tubes 73 to the upper section of chamber 58 for discharge out opening 64. The clarified liquid is returned to the work station through conduit 66. Valve 108 on underflow discharge nozzle 62 is kept throttled and locked in position in order to minimize the amount of liquid out with the underflow, since only enough to cause the solid impurities to flow through the conduit is necessary. However, should plugging occur, the valve is of the ball valve variety, so that by revolving handle 110 slightly the valve is opened to the extent of the full diameter of the nozzle to permit rapid unplugging of the outlet. The contaminated underflow portion containing the somewhat lighter solids, some of which have become agglomerated, is introduced by means of gravity continuously through second diffuser 37 into second reservoir 32 at a substantially constant reservoir entrance velocity in order to evenly distribute the entrained liquid and somewhat lighter solids across the second reservoir. The same considerations with respect to velocity and distirbution through second diffuser 37 apply as in the case of first diffuser 90, however, because of the lighter solids loading these considerations are not as critical, a large part of the solids having been already settled out in the first reservoir.

The liquid and solid impurities are retained in reservoir 32 for a predetermined time to permit settling to occur, with the action regarding the solids being the same therein as for first reservoir 12. However because of their somewhat lighter weight, the design residence time of the solids in reservoir 32 in greater than that in reservoir 12, and in some cases up to twice as much. The settled solids are gently conveyed from a lower zone of reservoir 32 out the exit end thereof by means of conveyor 42 operating in the same manner as that for reservoir 12.

As an important feature of the invention relating to the heretofore difficult removal of floating impurities, a portion of the liquid above the bottom zone of the second reservoir but below the liquid surface therein is continuously recycled by means of conduit 88, pump 84 and conduit 87 into the feed line 14 supplying diffuser 90 in reservoir 12, in order to cause a portion of the liquid and dispersed impurities, which are substantially the floating impurities such as oils and minute particles to overflow out of reservoir 12 along a substantial portion of one side of the reservoir. Thus this overflowing portion, since it comprises the upper portion of the liquid in the tank across a substantial surface area thereof, contains a very high concentration of floating impurities. The overflowing liquid passes into elongated skimming trough 31 whereupon it flows by gravity along the sloped bottom thereof to collection point 33, which, (FIGS. V and VI) is below the surface of the liquid in the first reservoir 12 but above the surface of the liquid in second reservoir 32. Trough 31 is elongated so as to be able to accept the overflow from along substantially the entire surface of the liquid in reservoir 12, and in any event should be at least 75 and preferably between about 75 to 90 percent of the length of the elongated side of generally rectangular reservoir 12. The liquid bearing a high concentration of "floats" thereupon passes by gravity through conduit 35 positioned well over the liquid in reservoir 32 and downwardly where it joins the underflow stream from separator 56 for introduction through diffuser 37 and slot 39 into reservoir 32 below the surface of the liquid therein. Though introduction is below the liquid surface it is above the lower settling zone of the reservoir in order to avoid disrupting the settled solids therein. The overflowing liquid is collected and introduced in this manner into reservoir 32, as opposed to overflowing directly over the top of the common side of the reservoirs, in order to avoid splashing which obviously would disturb the solids settling equilibrium in reservoir 32 as well as to establish a particular flow pattern of this liquid, to be now described. The slot 39 through which the liquid is introduced into reservoir 32 is oriented so that introduction is in the same direction as that of rotation of conveyor 42. Since this stream contains some solids which comprise the underflow stream from the separator, they tend to be conveyed in the opposite direction initially from that along which the solids are being conveyed out (FIG. I) to avoid short circuiting this solids portion of the total stream.

The portion of this stream which comprises floatable material, however, tends to impinge against baffle 83 and then reverse direction towards the solids discharge end of reservoir 32 during its rise to the surface of the liquid. It has been found that this flow pattern results in an unusually high concentration of "floats" in the area of the liquid surface adjacent the discharge end through which the conveyor flights are passing, with the result that these materials are gently skimmed off the liquid surface in the area adjacent the solids exit end by the flights of conveyor 42 as the latter rise up through the surface of the liquid along angled side or discharge ramp 38 partially loaded with settled solids forced from the bottom zone of the reservoir. Thus both floating oil impurities as well as solids are simultaneously discharged from reservoir 32 into a suitable sludge receptacle.

The above description and particularly the drawings are set forth for purposes of illustration only and are not to be taken in a limited sense.

The sequence of operations is particularly important in the process of the present invention. The efficiency of the centrifugal separator employed herein has been found to be substantially constant; therefore, by settling out as much as possible of the heavier solids prior to introduction of the liquid to the separator, the solids loading will be reduced and a cleaner liquid will be obtained out the overflow stream from the substantially constant efficiency separator than if the initial settling step was eliminated. Also, before attempting to remove floating material, it is isolated from the bulk of the heavy solids, collected and then concentrated in a single area of the system, as opposed to attempting to remove both oils and solids indiscriminately in a single pass. With respect to the somewhat lighter solid impurities, these are isolated in the second reservoir from the heavier, more easily settled solids in the first reservoir, whereupon a longer residence time is provided for their settling unhindered by the action of the heavier particles. Efficiency is optimized by reclaiming the underflow stream from the separator which would otherwise be sewered and utilizing it by means of recycle as a vehicle to extract the floating impurities from the first reservoir. Though time is allowed to permit settling of the solid impurities, the floating impurities are removed as quickly as possible, because of the continuous operation of the recycle stream, thus mimimizing any tendency of these materials to chemically deteriorate into substances which could sink to the bottom and thereby put an additional load on the various reservoirs.

The present system is applicable to all types of liquids utilized in machine tool work, though it has been found especially applicable where the collant is water with minor amounts of soluble lubricating materials dissolved therein.

The present invention is equally applicable to the handling of coolant issuing from a single or multiple machine stations. The system is uniquely adaptable to a multi station operation wherein coolant demand is variable. By means of suitable valving and piping, provisions can be made for continuously recycling portions of the clarified liquid back to the inlet to the system as downstream needs vary, thus avoiding the necessity of shutting down the system and disturbing the equilibrium therein.

As an optional feature of the invention, heat exchange equipment may be installed in the clarified liquid discharge line back to the work stations in order to cool and condition the purified stream in applications where the work piece, for example, is extremely sensitive to temperature. This is schematically depicted in FIG. X by means of heat exchanger 112. Obviously its location may be either upstream or downstream of the filter or it may optionally be used either with or without a filter or installed on the inlet supply line.

What is claimed is:
1. A method of clarifying liquids having impurities dispersed therein, which comprises:
 (a) delivering the liquid to be clarified to a first reservoir from a machining station;

(b) continuously forcing said liquid carrying said impurities through a first diffuser into said reservoir at a substantially constant reservoir entrance velocity to evenly disperse said liquid and said impurities therein across said reservoir;

(c) retaining said liquid and thereby said impurities in said reservoir for a predetermined time period to permit the bulk of a heavy solids portion of the impurities to settle to a bottom zone therein and to permit light floatable impurities to rise to the surface of the liquid therein;

(d) gently conveying said settled impurities and trace amounts of entrained liquid from the lower zone out an exit end of said first reservoir to withdraw said settled impurities and trace amounts of entrained liquid from said first reservoir without disturbing the gravitational settling occurring therein;

(e) passing a first portion of the liquid and dispersed impurities which are located below the top of the liquid level and above the zone of said settled solids in said first reservoir through a centrifugal separator to generate additional downwardly oriented forces on said first portion, thereby separating from said first portion additional solid impurities which are somewhat lighter than those settled in said first reservoir along with entrained liquid, to form an underflow stream issuing from said separator, the remainder of said first portion forming a clarified overflow stream issuing from said separator for return to said machining station;

(f) continuously introducing said underflow portion containing said somewhat lighter solid impurities and entrained liquid through a second diffuser into a second reservoir at a substantially constant reservoir entrance velocity to evenly disperse said entrained liquid and somewhat lighter solid impurities across said second reservoir;

(g) retaining said liquid and thereby said somewhat lighter solid impurities in said second reservoir for a predetermined time period which is in excess of that for said first reservoir to permit said somewhat lighter solid impurities to settle to a bottom zone therein;

(h) gently conveying said somewhat lighter solid impurities and trace amounts of entrained liquid from the lower zone of said second reservoir out an exit end of said second reservoir;

(i) continuously recycling a portion of the liquid above the bottom zone of said second reservoir back through said first diffuser into said first reservoir below the surface of the liquid therein to cause a second portion of the liquid and dispersed impurities which are substantially said floating impurities to flow out of said first reservoir along a substantial portion of one side of said first reservoir;

(j) collecting said overflowing second portion containing liquid and substantially floating impurities below the top of said side of said first reservoir and above the surface of the liquid level in said second reservoir;

(k) introducing said collected overflowing liquid and substantially floating impurities into said second reservoir through said second diffuser below the surface of the liquid therein in such a manner as to establish a flow pattern of said floating impurities to the surface of the liquid therein and then toward the solids exit end of said second reservoir; and (l) gently skimming said floating impurities off of the surface of the liquid in said second reservoir adjacent the solids exit end thereof.

2. The method of claim 1 wherein the liquid and dispersed impurities are introduced into said first reservoir at a velocity of between about 0.1 to 4 feet per second through an opening in said diffuser.

3. The method of claim 1 wherein all liquids and impurities are introduced into said first reservoir below the liquid level therein to keep disturbance of the longitudinal movements of the settling and rising impurities therein at a minimum.

4. The method of claim 1 wherein conveying of said settled solids from said first and second reservoirs is continuous.

5. The method of claim 1 wherein conveying of said settled solids from said first and second reservoirs is upwardly and over the top of one side of each.

6. The method of claim 1 wherein conveying of said settled solids from said first and second reservoirs is intermittently interrupted according to a predetermined time schedule when said solids are above the liquid levels and close to the solids exit ends of said reservoirs to permit trace amounts of liquids entrained with said solids to drain back into said reservoirs.

7. The method of claim 1 wherein the retention time of the solids in said second reservoir is approximately twice that of said first reservoir.

8. The method of claim 1 wherein the clarified overflow stream issuing from the separator is passed through a filter prior to return to the machining station to remove minor trace amounts of micronic sized impurities.

9. The method of claim 1 wherein said overflow from the first reservoir is maintained along at least about 75 percent of the side of said first reservoir which is adjacent to said second reservoir.

10. The method of claim 1 wherein the same means are used to skim floating oil impurities from the surface of the liquid in the second reservoir as are used to convey settled solids from the bottom zone of the second reservoir.

11. The method of claim 1 wherein the flow emanating from the first diffuser is oriented in the direction said settled solids are being conveyed from said first reservoir and the flow emanating from the second diffuser is oriented in a direction opposite from the direction said settled solids are being conveyed from said second reservoir.

12. The method of claim 1 wherein introduction of the flow into said second reservoir through said second diffuser is entirely by means of gravity.

13. A system for clarifying liquids having impurities dispersed therein comprising:
(a) a first reservoir for receiving the liquid to be clarified, said reservoir comprising a base and a plurality of spaced sides secured to and extending upwardly from the base;
(b) a generally horizontally disposed diffuser fixedly mounted within said reservoir for dispersing liquid to be clarified across said reservoir;
(c) means in said first reservoir for withdrawing settled solid impurities therefrom;
(d) a shallow, elongated collector adjacent one side of said first reservoir adapted to receive liquid and floating impurities overflowing from said first reservoir and to channel them to a low point in said collector;
(e) a second reservoir having inlet feed means therein connected to the low point of said collector, said second reservoir comprising a base and a plurality of spaced sides secured to and extending upwardly from the base of the second reservoir;
(f) a transfer pump having an inlet connected to said first reservoir above its base to withdraw partially clarified liquid therefrom;
(g) a centrifugal separator above said second reservoir having an inlet connected to the discharge side of said transfer pump, an overflow outlet for clarified liquid issuing from the separator and an underflow outlet for separated impurities and entrained liquid connected to the inlet feed means of said second reservoir;
(h) means in said second reservoir for simultaneously withdrawing settled solid impurities and floating impurities; and
(i) a recycle pump for withdrawing liquid from said second reservoir having an inlet connected above the base of said second reservoir and a discharge connected to the diffuser in said first reservoir to cause overflow of liquid from said first reservoir to said elongated collector.

14. The apparatus of claim 13 wherein the means for withdrawing solids from said first and said second reservoirs comprises an endless rotating conveyor in each reservoir having a series of spaced rakes attached thereto extending substantially across the lateral width of said reservoirs and adapted to move along said first and second reservoirs along the bottoms and up at least one side of each.

15. The apparatus of claim 14 including means for cleaning said rakes after each pass through a reservoir.

16. The apparatus of claim 13 wherein said first and second reservoirs have at least one of their sides fastened at an acute angle to its base.

17. The apparatus of claim 13 wherein said first and second reservoirs comprise an elongated tank separated along its axis into compartments defining said reservoirs such that the volume of the first reservoir exceeds that of the second reservoir.

18. The apparatus of claim 13 wherein said diffuser is an elongated generally cylindrical tube having an inlet at its center and having triangular slots cut in the wall below said inlet, said slots having their apexes abutting in a plane passing through the center of said inlet.

19. The apparatus of claim 18 wherein the slots of the diffuser are oriented such that the flow therethrough is in a direction opposite to that of the rotation of said means for withdrawing solids in said first reservoir.

20. A system for clarifying liquids having impurities dispersed therein comprising:
   (a) a generally rectangular first reservoir for initially receiving the liquid to be clarified, said reservoir having a base, a pair of opposed sides and a pair of opposed ends, said sides and ends being secured to the periphery of the base, one of said ends being secured to the base at an angle of between about 30 to 50 degrees;
   (b) a generally horizontally disposed diffuser fixedly mounted within said reservoir for dispersing liquid to be clarified across said reservoir;
   (c) conveying means in said first reservoir adapted to rotate at between about 2 inches to 3 feet per minute for gently withdrawing settled solid impurities out of said first reservoir along the angled end and over the top thereof;
   (d) a shallow trough having a length equivalent to between about 75 to 90 percent of a side of said first reservoir, secured to said side below the top thereof, said trough having a low point therein for collecting liquid and floating impurities overflowing from said first reservoir;
   (e) a generally rectangular second reservoir having a volumetric capacity less than that of said first reservoir, said second reservoir having a base, a pair of opposed sides and a pair of opposed ends, one of said ends being secured to said base of the second reservoir at an acute angle therewith, said second reservoir having a laterally disposed diffuser mounted therein connected by means of a conduit to the low point of said trough for receiving in and dispersing said overflowing liquid and floating impurities across said second reservoir;
   (f) a transfer pump having an inlet connected to said first reservoir above the base thereof for withdrawing partially clarified liquid therefrom;
   (g) a centrifugal separator above said second reservoir having an inlet connected to the discharge side of said transfer pump, an overflow outlet for clarified liquid issuing from the separator and an underflow outlet for separated impurities and entrained liquid connected to the conduit between the low point of the trough and the diffuser in the second reservoir;
   (h) conveying means in said second reservoir for gently withdrawing settled solids and floating impurities out of said second reservoir along and over the top of the angled end of said second reservoir; and
   (i) a recycle pump for withdrawing partially clarified liquid from siad second reservoir having an inlet connected to said second reservoir above the base thereof and a discharge connected to the diffuser in said first reservoir to cause overflow of liquid and floating impurities from said first reservoir into said trough.

21. The apparatus of claim 20 including a baffle within said second reservoir adjacent the recycle pump to minimize entrance of impurities into said pump from said second reservoir.

22. The apparatus of claim 20 including level control means for introducing clarified liquid into the second reservoir to maintain a substantially constant liquid level therein.

References Cited

UNITED STATES PATENTS

| | | | |
|---|---|---|---|
| 2,494,534 | 1/1950 | Armstrong et al. | 210—298 X |
| 2,861,688 | 11/1958 | Harms | 210—73 |
| 3,341,983 | 9/1967 | Baldenhofer et al. | 210—167 X |
| 3,385,448 | 5/1968 | Honan et al. | 210—526 X |

J. L. DeCESARE, Primary Examiner

U.S. Cl. X.R.

210—167, 195, 298, 512, 519, 526